US007225946B2

(12) United States Patent
Gardos

(10) Patent No.: US 7,225,946 B2
(45) Date of Patent: Jun. 5, 2007

(54) CONSTANT PRESSURE FLUID-DISPENSING PUMPING SYSTEM AND METHOD

(75) Inventor: Ivan Gardos, Shrewsbury, MA (US)

(73) Assignee: DTIC Dispensing Technologiesa a Division of Stainless Steel Coatings, Inc., So. Lancaster, MA (US)

( * ) Notice: Subject to any disclaimer, the term of this patent is extended or adjusted under 35 U.S.C. 154(b) by 412 days.

(21) Appl. No.: 10/733,938

(22) Filed: Dec. 11, 2003

(65) Prior Publication Data
US 2005/0127088 A1 Jun. 16, 2005

(51) Int. Cl.
B67B 7/00 (2006.01)

(52) U.S. Cl. .............. 222/1; 222/145.1; 222/145.5; 222/145.6; 222/333; 222/250; 222/261; 222/63

(58) Field of Classification Search .......... 222/1, 222/145.1, 145.6, 63, 333, 386, 390, 249, 222/250, 260, 261
See application file for complete search history.

(56) References Cited

U.S. PATENT DOCUMENTS 4,279,360 A * 7/1981 Hauser .................... 222/1
4,741,623 A * 5/1988 Haeuser et al. .......... 366/160.2
4,832,499 A * 5/1989 Fiorentini ................ 366/152.1
4,979,639 A * 12/1990 Hoover et al. ............ 222/1
5,271,521 A * 12/1993 Noss et al. ................ 222/1
5,816,445 A * 10/1998 Gardos et al. ............ 222/1
6,050,450 A * 4/2000 Gardos .................... 222/1
6,348,124 B1 * 2/2002 Garbett et al. ........ 156/345.12
6,921,000 B2 * 7/2005 Wagner et al. ............ 222/1
2005/0115712 A1 * 6/2005 Watson ..................... 166/311

* cited by examiner

Primary Examiner—Patrick F. Brinson
(74) Attorney, Agent, or Firm—Rines and Rines

(57) ABSTRACT

An improved microprocessor-controlled dual piston-pump viscous fluid dispensing system as for dispensing uniform sealing beads and the like (as well as other types of uniform deposits), wherein the pressure throughout the fluid path is maintained constant including during the switching alternately between filled and emptying pumps of the pair, assuring a constant dispensing rate, including during the switchover of the pumps.

8 Claims, 2 Drawing Sheets

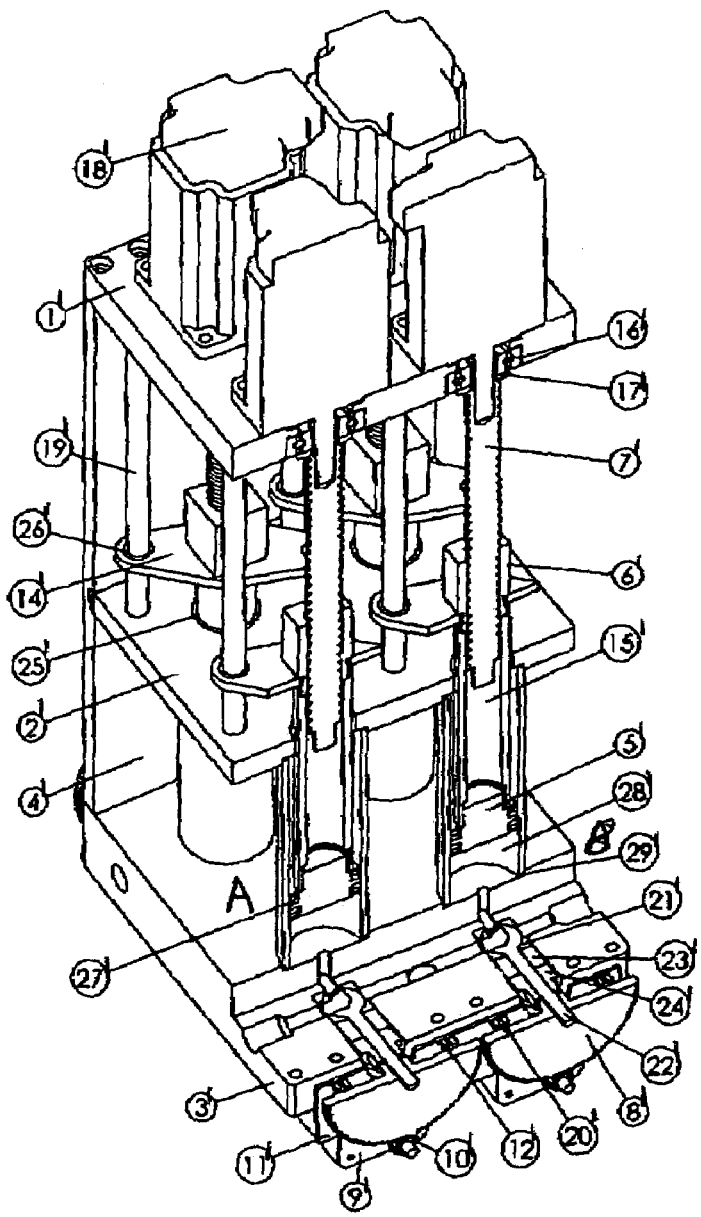

Figure 1:
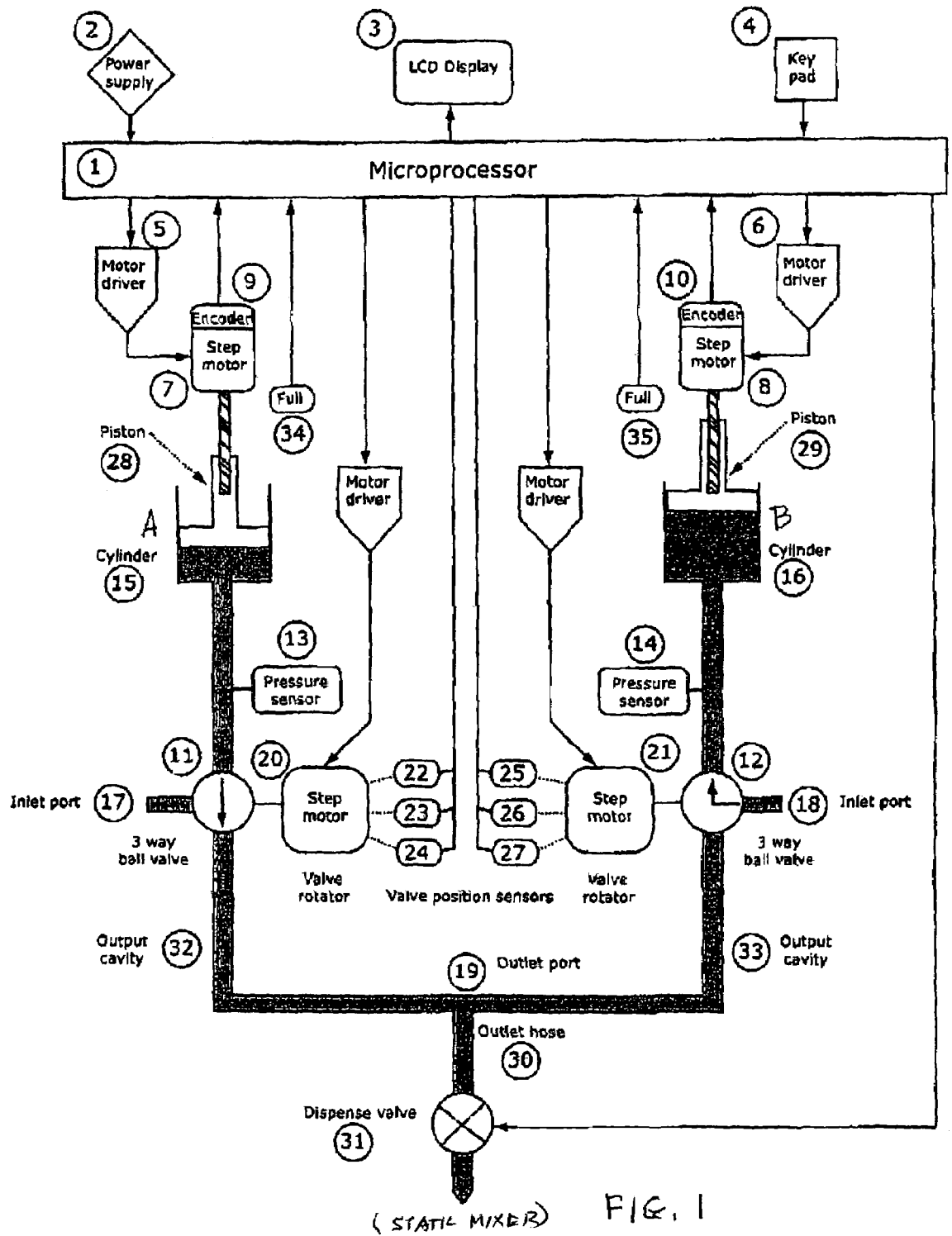

| ITEM NO | PART NUMBER |
|---|---|
| 1 | MOTOR MOUNT VARIABLE RATIO |
| 2 | CYLINDER TOP PLATE |
| 3 | VALVE LOCK |
| 4 | SIDE PLATE CYLINDER MOUNT |
| 5 | PISTON B |
| 6 | BALL NUT 0631 |
| 7 | LEAD SCREW D0631 X L0200 |
| 8 | S:0842_032DS092 |
| 9 | STEP MOTOR LINN 017 4118L |
| 10 | A_IC_9_Y32012 |
| 11 | SENSOR PCB |
| 12 | OPTICAL SLOTTED SENSOR |
| 13 | PRESSURE SENSOR |
| 14 | ANTI ROTATE ARM |
| 15 | PISTON TUBE |
| 16 | ANGULAR BEARING |
| 17 | BEARING WASHER |
| 18 | STEPMOTOR_SANYODENKI |
| 19 | GUIDE ROD |
| 20 | VALVE POSITION INDICATOR PIN |
| 21 | VALVE SEAT |
| 22 | VALVE BALL |
| 23 | VALVE PACKING |
| 24 | VALVE PACKING NUT |
| 25 | PISTON TUBE BUSHING |
| 26 | GUIDE ROD BUSHING |
| 27 | PISTON SEAL |
| 28 | CYLINDER B |
| 29 | CYLINDER O RING |

FIG. 2

CONSTANT PRESSURE FLUID-DISPENSING PUMPING SYSTEM AND METHOD

FIELD

The present invention relates to pressurized fluid-dispensing systems and techniques, being particularly, though not exclusively, directed to the dispensing of viscous fluids such as resins, epoxies, urethanes, adhesives, silicones and the like and including both single and dual component catalytic materials, and to applications concerned even more particularly, but again not exclusively, with the requirement of uniformly dispensed materials as for gasket heads and similar adhering seals and the like.

BACKGROUND

While the art is replete with numerous types of pressurized-fluid dispensing apparatus, systems and machines, including those for the above and other viscous fluids, and for a myriad of different uses and applications, many employ cylindrical chamber piston-activated pumps for enabling the microprocessor-controlled pressurized dispensing of fluid that is filled into and then dispensed from the volume of the piston chambers. In view of the limited volume of such piston chambers, however, pairs of such pumps or dual or double-acting pumps have been employed with valving techniques for switching from an emptied piston-pump chamber to an adjacent filled pump chamber for fluid dispensing through a common static mixer or other dispensing head. A typical system of this type is the 2500 series double-acting dispensers of Ashley Cross Company of Newburyport, Mass. and similar resin-dispensing systems of others wherein when one piston pump empties, the other is switched to the dispensing head to continue the fluid dispensing while the emptied piston chamber is re-filled with fluid.

Unfortunately, for some applications, however, where strict uniformity of the dispensed fluid is essential, as, for example, in laying down a uniform sealing bead as for adhering a gasket or the like, the switching from one dispensing pump to the second usually involves an interruption in the dispensed fluid flow, or at least a marked variation in its deposit—generally, quite abrupt stopping during the transfer—that forbids the laying down of a constant-dimension bead throughout.

It is to the solution of this problem and other related difficulties with such prior art piston pump dispensing systems that the present invention is primarily directed, the invention providing for constant velocity of fluid dispensing flow throughout the alternate dispensing and filling of the pairs of piston pump chambers, including during the switching between them.

OBJECTS OF INVENTION

It is accordingly a principal object of the invention to provide a new and improved pressurized fluid-dispensing microprocessor-controlled pumping system and method that shall not be subject to the above-described and other limitations and problems of prior systems but that, to the contrary, shall provide for a constant pressure dispensing of uniform deposits even during the switching between alternately dispensing and filling pairs of piston pumps.

A further object is to provide an improved viscous fluid piston pump dispensing system of more general application as well.

Other and further objects will be explained hereinafter and are more particularly delineated in the appended claims.

SUMMARY

In summary, however, from one of its important aspects, the invention embraces a method of uniformly dispensing pressurized fluid in a fluid path containing a pair of alternately filling and dispensing piston pump cylinders adapted alternately to dispense the fluid through a common dispensing outlet; that comprises, controlling the dispensing of fluid from one pump cylinder to the outlet at a predetermined dispensing pressure and predetermined dispensing rate; as the fluid in one pump cylinder is emptying, decelerating its dispensing rate; during such decelerating, accelerating the dispensing to the outlet of the fluid filled in the other pump cylinder; controlling the decelerating in the said one pump cylinder and the accelerating in the other, so as to maintain constancy of said predetermined fluid dispensing rate at the outlet, including during the transition of dispensing from said one to said other pump cylinder; and refilling the fluid in the said one pump cylinder during the dispensing by said other pump cylinder.

Preferred and best mode designs and techniques are hereinafter fully detailed.

DRAWINGS

The invention will now the explained in connection with the accompanying drawings, FIG. 1 of which is a block and operating system diagram illustrating a preferred implementation of the invention; and FIG. 2 is an isometric view, partially cut away, of a constant flow piston pump construction suitable for use in the system of FIG. 1, with a specification of the parts thereof.

DESCRIPTION OF PREFERRED EMBODIMENT(S) OF INVENTION

As before stated, the purpose of the design of the present invention is to produce a constant flow rate pump by using the combined flow from two separate piston pumps. The combined action of the two pumps can continuously dispense a volume of viscous and similar fluids that is larger than the individual volume of either. As one pump dispenses, the other refills. While this method in itself is not new, however, present-day implementations all share the same serious short coming that when the flow switches over from one pump to the other, the flow is momentarily disrupted. This, as earlier explained, may have serious consequences in particular applications requiring the dispensing of beads or layers of constant cross section, or when dispensing a two-part material where the ratio must not vary.

The system of FIG. 1 and the pump construction of FIG. 2 achieve such constant flow rate by using the combination of microprocessor control of motors, valves and pressures in the system in a unique configuration of the hardware/software combination to produce the desired constant flow rate dispensing. In order to dispense accurately, however, such dispensing systems must dispense at such a constant rate. The dispensing pressure is determined by the viscosity of the material, the speed of the dispensing and the resistance to flow that the material encounters throughout the system. During switchover between pairs of dispensing pumps, as previously noted, this pressure and flow rate must be maintained constant.

The system schematic of FIG. 1 enables this result with the pair of pumps A and B, shown as of the positive displacement piston-pump variety having respective pump cylinders 15 and 16. Each pump cylinder 15 and 16 has a 3-way ball valve 11 and 12 respectively, attached to its single port. This ball valve controls the flow into or out of the pump cylinder. The ball valve has four positions: 1) Fill; 2) Off; 3) Partial; 4) Dispense.

In the Fill position, the valves direct flow from the fluid supply inlet ports 17 and 18 to the respective pump cylinders 15 and 16. In the Off position, all flow to or from the pump cylinders is cut off. In the Partial position, the ball valves 11 and 12 are opened just enough to verify the pressure balance (later explained). In the Dispense position, the ball valves direct flow from the pump cylinders to the single, common outlet port 19. Step motors 20 and 21 rotate respective ball valves 11 and 12.

The valve positions are read by valve position sensors 22–27. Initially, the Partial position of the ball valves is determined by applying dispensing pressure with the valve closed, and then slowly rotating the ball valve until the pressure drops slightly.

Attached to the common outlet port 19 is the dispensing hose 30, in turn attached to a dispensing valve 31 and, depending on the application, to a static mixer, so-indicated at the bottom of FIG. 1.

The system of FIG. 1 preferably uses step motors 7 and 8 with attached respective encoders 9 and 10 to drive the respective pumps. The software in the microprocessor 1 controls the speed of the pump step motors by sending signals to the pump motor drivers 5 and 6. The encoders are used to verify that the pumps are precisely following the programmed speed of dispensing. Pressure sensors 13 and 14 constantly measure the pressure in the respective pump cylinders 15 and 16 of the pair of pumps A and B.

The user enters the dispensing parameters into the microprocessor 1 in well-known fashion. The user is prompted by the LCD display 3 to enter this information, using the keypad 4 into the microprocessor 1, in conventional fashion. Initially, the required pressure to fill the pump cylinders within a user-specified time is determined. This predetermined pressure is then entered into the microprocessor 1.

When the system starts up, it initially refills both pump cylinders. First, the ball valves 11 and 12 rotate to the Fill position. With the pump cylinders now opened to the respective inlet ports, the pressure sensors are used to verify that the input pressure is sufficient to fill the cylinders. If not, an error message is generated and the system halts until the user corrects the problem. If the inlet pressure drops during the refilling cycle, the cycle is terminated, an error message is generated, and the system halts until the user corrects the problem. The pump cylinder full position is detected by full position sensors shown at 34 and 35.

The system is then purged. To do this, the dispense valve 31 is opened and both ball valves 11 and 12 are rotated to their Dispense position. The system now fills the respective output cavities 32 and 33 as well as the outlet hose 30, all the way to its end where the dispense valve is attached. The length of the dispense hose depends upon the user's requirement. With the system purged, the dispense valve 30 and both ball valves 11 and 12 are closed.

To dispense, ball valve 11 opens to the Dispense position. Step motor 7 drives piston 28 in pump cylinder 15 of pump A. The pressure sensor 13 monitors the pressure and when the required dispensing pressure is reached, the dispensing valve 31 opens. The required predetermined dispensing pressure may be determined by previous experiment—for example, 350 psi for proper dispensing of the material. Encoder 9 is used to verify that dispensing is taking place and at the exact rate specified. Pressure sensor 13 is used to verify that the dispensing pressure is maintained within the predetermined range. An error from the encoder or a high pressure reading indicates a blockage of fluid flow. A low pressure reading indicates escape of material from the system. In either case, dispensing terminates and a warning is sounded. The user or operator must correct the problem before dispensing can resume. If no error is detected, dispensing continues.

As the dispensing so continues, the software continuously recalculates the remaining volume of material in the pump cylinder based on the known pump cylinder volume, dispensing speed, and elapsed time. When the volume reaches the near-empty point, the switchover from pump A to the other pump B is initiated.

The following steps are used for the switchover from cylinder 15 of pump A to cylinder 16 of pump B.

1) Step motor 8 drives piston 29. Pressure sensor 14 reads the increasing pressure in the pump cylinder 16. When the pressure matches the dispensing pressure, step motor 8 stops.
2) The step motor 21 rotates ball valve 12 to the Partial position. This opens the ball valve 2 just enough to expose the pump cylinder 16 to the dispensing pressure. If the pressure in the pump cylinder 16 remains the same as before, then the ball valve 12 opens to the dispensing position. A large pressure change in the partial open valve position is an indication of pump failure.
3) Now, with both ball valves 11 and 12 in the Dispense position, step motor 7 starts to decelerate while step motor 8 starts to accelerate. The total combined speed of acceleration and deceleration at any point in time exactly equals the programmed dispensing speed. When step motor 8 reaches full dispensing speed, step motor 7 reaches zero dispensing speed.
4) Step motor 20 rotates ball valve 11 to the Fill position.
5) Step motor 7 retracts piston 28 to refill pump cylinder 15.
6) Full position sensor 34 detects when piston 28 reaches the full position and notifies the microprocessor to stop refilling.
7) Ball valve 11 closes.

At this point, cylinder 16 is continuing dispensing and cylinder 15 has been refilled. The same procedure as that just described is repeated for switching from cylinder 16 of pump B back to cylinder 15 of pump A, as follows:

8) Step motor 7 drives piston 28. Pressure sensor 13 reads the increasing pressure in the pump cylinder 15. When the pressure matches the dispensing pressure, step motor 7 stops.
9) Step motor 20 rotates ball valve 11 to the Partial position. This opens the ball valve 11 just enough to expose the pump cylinder 15 to the dispensing pressure.
10) Now, with both ball valves 11 and 12 in the dispense position, step motor 8 starts to decelerate while step motor 7 starts to accelerate.
11) Step motor 21 rotates ball valve 12 to the Fill position.
12) Step motor 8 retracts piston 29 to refill pump cylinder 16.
13) Full position sensor 35 detects when piston 29 reaches the full position and notifies the microprocessor 1 to stop refilling.
14) Ball valve 12 closes.

At this point, cylinder 15 of pump A is dispensing, and cylinder 16 of pump B has been refilled. This cycle of events continues until the program halts the dispensing.

Through this use of dual piston pump modules working in tandem, a continuous dispensing is effected without the need to pause during the refill cycle, as would be the case if the A component and B component were each to pass through a single pumping system. Instead, as one pump cylinder dispenses, the other refills. And the ability to operate without interruption greatly increases the potential size of a given sealant bead, for example, since the maximum volume of the dispense cycle is now determined by the capacity of the material reservoirs (e.g. two 5 gallon tanks) and not by the volume held within any one of the cylinders.

The output of the pumps in practice is routed to the dispensing head through high pressure, metal braid, Teflon hoses, and the dispensing head contains pneumatically operated shut-off valves to eliminate dripping or fluid run-on, once the desired volume of material has been dispensed.

Prototype apparatus has been used, for example, for dispensing high viscosity fluids (e.g. 300,000 cps filled material) at a rate of, for example, 200 ml/minute, with the system offering features that promote its accuracy, repeatability and ease-of-use. The dispensing system allows authorized personnel to set (1) the mix ratio of materials in a range from 1.00:1.00 to 25.00:1.00; (2) the bead volume/inch; and (3) the dispensing rate, simply by entering values from the keyboard 4 and with no mechanical adjustment required.

The pair of software driven-dual piston pump modules forming the heart of the system, enables the use of positive displacement technology with each piston being driven independently by a closed-loop step motor to achieve accurate dispensing and verify performance, as above described. The system, moreover, readily lends itself to use with a vertically positioned XYZ table where desired.

To summarize the principles of operation of the invention, the system is designed to dispense material at a constant rate in order to deliver controlled uniform beads or similar deposits. The key to achieving this is to maintain constant pressure throughout the system; i.e., at every point from the cylinders, through the hoses, dispensing head, and static mixer. If the pressure isn't held constant, then the hoses will expand and contract and, as a consequence, the dispensing rate will vary, leading to uneven beads.

It is especially critical, as earlier discussed, to maintain constant system pressure during the material switchover from one pump cylinder to the other. The following steps summarize the procedure used to assure a smooth transition in the alternate dispensing between cylinders.

1. The filled cylinder is brought to the required pressure.
2. The valve of the filled cylinder moves from the closed to the dispense position.
3. The valve of the partially empty cylinder moves from the dispense to the refill position.
4. The step motor driving the piston in the filled cylinder accelerates to the desired dispensing speed.
5. The step motor driving the piston in the partially empty cylinder decelerates to a stop.
6. The partially empty cylinder refills.

It should be noted that steps 2–5 occur substantially simultaneously and that each cylinder valve is independently driven by its own step motor so that the valve opening and closing rate can be precisely controlled. The step motors, moreover, accelerate and decelerate such that their combined speeds remain equal to the desired dispensing speed, with such control of the valves and motors assuring that the pressure throughout the fluid path, and therefore the dispensing rate, remains constant.

The cut-away isometric view of FIG. 2 (using different reference numerals from the system diagram of FIG. 1) illustrates a most suitable construction design mode for the constant flow piston pump apparatus, including the pair of dual piston pumps A and B, and the parts thereof are identified in the table to the right.

Where multiple component fluids are to be dispensed, such as resins and catalyst fluids or the like, two pairs of piston pumps may be used. As earlier mentioned, variable mix ratios may also readily be adjusted.

Further modifications will also occur to those skilled in this art, and such are considered to fall within the spirit and scope of the invention as defined in the appended claims.

What is claimed is:

1. A method of continuously and uniformly dispensing pressurized fluids, such as viscous fluids, from a common dispensing outlet fed from a dispensing system comprising a pair of alternately filling and emptying fluid-dispensing pumps, each connected to the dispensing outlet, that comprises, slowing the dispensing from the emptying pump while accelerating the dispensing from the filled pump to switchover thereto; refilling the emptied pump during the switched over dispensing of the other pump; and maintaining a constant system pressure during the switchover of the dispensing from one pump to the other to insure a predetermined constant dispensing rate at said outlet, wherein the dispensing pumps are positive displacement piston pumps driven by microprocessor-controlled respective step motors, each piston being driven independently by closed-loop step motor control to achieve accurate dispensing and verify performance, wherein said slowing and accelerating of the respective pump dispensing to said common outlet is effected by respective microprocessor-control of respective valves responsive to the continual sensing of pump fluid pressure and of fluid filling therein, and wherein said valves have multiple-way valving operation comprising a Fill position, wherein the refilling of the empty pump is started; a Dispense position wherein the emptying pump dispensing is decelerated by its step motor, while the filled pumps dispensing starts to accelerate under the action of its step motor; and a Partial position, wherein the filled pumps is first just exposed to the dispensing pressure and, if the same, then opens to the Dispense position.

2. The method of claim 1 wherein the complete filling of the re-filled pump is sensed to notify the microprocessor to stop refilling.

3. The method of claim 1 wherein the total combined speed of acceleration and deceleration at any point in time is controlled exactly to equal the programmed predetermined dispensing rate, with the step motor driving the switched-over pump reaching full dispensing speed, and the step motor of the emptied pump reaching zero dispensing speed.

4. The method of claim 3 wherein the multiple-way valving operation is controlled by further step-motor control of the valve position, with valve position sensing and with microprocessor-controlled driving of said further step-motor control.

5. Apparatus for continuously and uniformly dispensing pressurized fluids, such as viscous fluids, from a common dispensing outlet in a dispensing system comprising a pair of alternately filling and emptying fluid-dispensing Pumps, each connected to the dispensing outlet, the apparatus having, in combination, means for slowing the fluid dispensing from the emptying pump while accelerating the dispensing from the filled pump to switch over thereto; means for refilling the empty pump during the dispensing of the other pump; and means for maintaining a constant system pressure during the switchover of the dispensing from one pump to the other, to insure a predetermined constant dispensing rate at said outlet, wherein the dispensing pumps are positive displacement piston pumps driven by microprocessor-controlled respective step motors, each piston being driven independently by a closed-loop step motor control to achieve accurate dispensing and to verify performance, wherein the slowing and accelerating of the respective pump dispensing at the said outlet is effected by respective microprocessor-control of respective values responsive to the continual sensing of pump pressure and of fluid filling therein, and wherein said valves have multiple-way valving operation comprising a Fill position, wherein the refilling of the emptied pump is started; a Dispense position, wherein the emptying pump dispensing is decelerated by its step motor, while the filled pump dispensing starts to accelerate under the action of its step motor; and a Partial position, wherein the filled pump is first just exposed to the dispensing pressure and, if the same, the valve then opens for the Dispense position.

6. The apparatus of claim 5 wherein sensing means is provided for sensing complete filling of the re-filled pump and notifying the microprocessor to stop refilling.

7. The apparatus of claim 5 wherein means is provided for controlling the total combined speed of acceleration and deceleration at any point in time to be exactly equal to the programmed predetermined dispensing rate, with the step motor driving the switched-over pump reaching full dispensing speed, and the step motor of the emptied pump reaching zero dispensing speed.

8. The apparatus of claim 7 wherein the multiple-way valving operation is controlled by further step-motor control of the valve position, with valve position sensing and with microprocessor-controlled driving of said further step-motor control.

* * * * *